United States Patent
Ma et al.

(10) Patent No.: US 10,212,385 B2
(45) Date of Patent: Feb. 19, 2019

(54) WIRE FIXATION APPARATUS AND DISPLAY DEVICE

(71) Applicant: BOE TECHNOLOGY GROUP CO., LTD., Beijing (CN)

(72) Inventors: Yongda Ma, Beijing (CN); Jianbo Xian, Beijing (CN); Yong Qiao, Beijing (CN); Yuxin Zhang, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

(21) Appl. No.: 15/662,828

(22) Filed: Jul. 28, 2017

(65) Prior Publication Data

US 2018/0035073 A1 Feb. 1, 2018

(30) Foreign Application Priority Data

Jul. 29, 2016 (CN) ...................... 2016 2 0817241 U (51) Int. Cl.
*H02G 3/22* (2006.01)
*H04N 5/64* (2006.01)
*G02F 1/1333* (2006.01)
*G06F 1/16* (2006.01)

(52) U.S. Cl.
CPC ............. *H04N 5/64* (2013.01); *G02F 1/1333* (2013.01); *G06F 1/1601* (2013.01)

(58) Field of Classification Search
CPC .. H02G 3/22; H02G 3/32; H02G 3/26; H02G 3/30; G02F 1/1333; G06F 1/1601; H05K 7/14

USPC ......... 174/68.1, 68.3, 40 CC, 44, 135, 72 A; 248/49, 68.1, 74.1, 74.2, 74.3, 56, 62, 63
See application file for complete search history.

(56) References Cited

U.S. PATENT DOCUMENTS

| | | | | |
|---|---|---|---|---|
| 3,659,319 A | * | 5/1972 | Erickson | H02G 3/266 248/74.1 |
| D292,554 S | * | 11/1987 | Yagi | D8/382 |
| D293,205 S | * | 12/1987 | Nakano | D8/382 |
| D473,449 S | * | 4/2003 | Wu | D8/356 |
| 7,523,898 B1 | * | 4/2009 | Barry | F16B 5/0685 174/164 |

(Continued)

*Primary Examiner* — Angel R Estrada
(74) *Attorney, Agent, or Firm* — Brooks Kushman P.C.

(57) ABSTRACT

A wire fixation apparatus and a display device are provided. The wire fixation apparatus includes: a first snap structure, half surrounding a wire and provided with a first opening at a side thereof; a second snap structure, half surrounding a wire and provided with a second opening at a side thereof; and an auxiliary installation plate connecting the first snap structure to the second snap structure. The first opening of the first snap structure is opposite to the second opening of the second snap structure. The first snap structure, the second snap structure and the auxiliary installation plate together form a wire channel for the wire to pass therethrough, and an interval is arranged between the first snap structure and the second snap structure to enable the wire to be snapped into the wire channel through the interval. Projections of the first snap structure, the second snap structure and the auxiliary installation plate onto a first projection plane together encircle a projection of the wire onto the first projection plane. The first projection plane is a plane of a cross section of the wire.

11 Claims, 6 Drawing Sheets

(56) References Cited

U.S. PATENT DOCUMENTS

| | | | | |
|---|---|---|---|---|
| 7,527,226 B2* | 5/2009 | Kusuda | ............... | H02G 3/30 248/68.1 |
| 8,507,794 B2* | 8/2013 | Wada | ............... | H02G 3/32 174/135 |
| 8,844,883 B2* | 9/2014 | Tsutsumi | ............... | H02G 3/32 248/74.2 |
| 9,012,775 B2* | 4/2015 | Yang | ............... | H05K 7/1447 174/135 |

* cited by examiner

WIRE FIXATION APPARATUS AND DISPLAY DEVICE

CROSS-REFERENCE TO RELATED APPLICATION

This application claims a priority to Chinese Patent Application No. 201620817241.X filed on Jul. 29, 2016, the disclosures of which are incorporated in their entirety by reference herein.

TECHNICAL FIELD

The present disclosure relates to the field of display technology, and in particular to a wire fixation apparatus and a display device.

BACKGROUND

In the related art, inner wires of the television are commonly fixed by a wire fixation snap, a ribbon-type wire fixation buckle or an adhesive tape. The wires are connected to each other by the adhesive tapes, so in the assembly process, the human resources may be wasted, and it is difficult to disassemble the product. In addition, when the adhesive tape has been used for a long time, the adhesive force may be reduced, and the wires may fall off. In the related art, the wire fixations snap in the televisions is commonly of a half-open and half-surrounded structure, and the wire fixations snap of the half-surrounded structure is insufficient to fix the wire firmly, and the wire may come away from the snap during a transportation. Although the ribbon-type wire fixation buckle is of a full-surrounded structure, the product having such buckle is difficult to be disassembled. The binding belt is disposable and needs to be replaced after the disassembling.

SUMMARY

An objective of the present disclosure is to provide a wire fixation apparatus and a display device, where the wire fixation apparatus is of a full-surrounded structure.

A wire fixation apparatus is provided in at least one embodiment of the present disclosure, including: a first snap structure, provided with a first opening at a side thereof; a second snap structure, provided with a second opening at a side thereof; and an auxiliary installation plate connecting the first snap structure to the second snap structure. The first opening of the first snap structure is opposite to the second opening of the second snap structure, the first snap structure, the second snap structure and the auxiliary installation plate together form a wire channel for the wire to pass therethrough, and an interval is arranged between the first snap structure and the second snap structure to enable the wire to be snapped into the wire channel through the interval. Projections of the first snap structure, the second snap structure and the auxiliary installation plate onto a first projection plane together encircle a projection of the wire channel onto the first projection plane, and the first projection plane is perpendicular to an extension direction of the wire channel.

Optionally, the first snap structure includes a first connection portion fixed onto the auxiliary installation plate and a first snap portion connected to the first connection portion; and the second snap structure includes a second connection portion fixed onto the auxiliary installation plate and a second snap portion connected to the second connection portion.

Optionally, the first snap structure is spaced apart from the second snap structure in the extension direction of the wire channel by a predetermined distance, to form the interval between the first snap structure and second snap structure; and the projection of the first snap portion onto the first projection plane partially overlaps the projection of the second snap portion onto the first projection plane, to enable the projections of the first snap structure, the second snap structure and the auxiliary installation plate onto the first projection plane together to encircle the projection of the wire channel onto the first projection plane.

Optionally, the first snap portion includes a first connection plate formed by a portion of the first connection portion and a second connection plate formed by a portion of the first connection plate bent towards the auxiliary installation plate, where the first opening is formed in the second connection plate. The second snap portion includes a third connection plate formed by a portion of the second connection portion and a fourth connection plate formed by a portion of the third connection plate bent towards the auxiliary installation plate. The second opening is formed in the fourth connection plate, and a projection of the first connection plate onto the first projection plane partially overlaps a projection of the third connection plate onto the first projection plane.

Optionally, the first snap portion includes a fifth connection plate formed by a portion of the first connection portion, and the first opening is formed between the fifth connection plate and the auxiliary installation plate. The second snap portion includes a sixth connection plate formed by a portion of the second connection portion, and the second opening is formed between the sixth connection plate and the auxiliary installation plate. The first connection portion is arranged opposite to the second connection portion, at least a portion of the fifth connection plate is arranged right above the sixth connection plate and at a side of the sixth connection plate away from the auxiliary installation plate, to enable the projections of the first snap structure, the second snap structure and the auxiliary installation plate onto the first projection plane together to encircle the projection of the wire channel onto the first projection plane; and a gap is formed between the fifth connection plate and the six connection plate, to form the interval.

Optionally, the fifth connection plate is formed by a portion of the first connection portion bent towards the auxiliary installation plate, and the sixth connection plate is formed by a portion of the second connection portion bent towards the auxiliary installation plate.

Optionally, the first snap portion includes a seventh connection plate formed by a portion of the first connection portion, and the first opening is arranged between the seventh connection plate and the first connection portion; the second snap portion includes an eighth connection plate formed by a portion of the second connection portion and a ninth connection plate formed by a portion of the eighth connection plate bent towards the auxiliary installation plate, and the second opening is arranged between the ninth connection plate and the second connection portion. At least a portion of the ninth connection plate is arranged right above the seventh connection plate and at a side of the seventh connection plate away from the auxiliary installation plate, to enable the projections of the first snap structure, the second snap structure and the auxiliary installation plate onto the first projection plane together to encircle the projection of the wire channel onto the first projection plane; and a gap is formed between the ninth connection plate and the seventh connection plate, to form the interval.

Optionally, the first snap structure is connected to the second snap structure to form an integral structure.

Optionally, the first snap structure includes a first connection portion and a first snap portion formed by a portion of the first connection portion bent towards the auxiliary installation plate, the second snap structure includes a second connection portion and a second snap portion formed by a portion of the second connection portion bent towards the auxiliary installation plate. The first snap portion is spaced apart from the auxiliary installation plate, to form a first gap between the first snap portion and the auxiliary installation plate, the second snap portion is spaced apart from the auxiliary installation plate, to form a second gap between the second snap portion and the auxiliary installation plate; and projections of the first snap portion and the second snap portion onto at least one of the first projection plane and the auxiliary installation plate at least partially overlap each other.

Optionally, the first snap structure is spaced apart from the second snap structure by a predetermined distance in an extension direction of the wire channel, to form the interval; and projections of the first snap portion and the second snap portion onto the first projection plane at least partially overlap each other, to form the wire channel.

Optionally, the first snap portion includes a first connection plate formed by a portion of the first connection portion bent towards the second snap structure and a second connection plate formed by a portion of the first connection plate bent towards the auxiliary installation plate, where the first gap is formed between the second connection plate and the auxiliary installation plate. The second snap portion includes a third connection plate formed by a portion of the second connection portion bent towards the first snap structure and a fourth connection plate formed by a portion of the third connection plate bent towards the auxiliary installation plate, where the second gap is formed between the fourth connection plate and the auxiliary installation plate. An end of the second connection plate is not in contact with the first connection portion, and an end of the fourth connection plate is not in contact with the second connection portion; and a projection of the first connection plate onto the first projection plane partially overlaps a projection of the third connection plate onto the first projection plane.

Optionally, the first snap structure and the second snap structure are oppositely arranged in a direction perpendicular to the wire channel; the first snap portion includes a fifth connection plate formed by a portion of the first connection portion bent towards the second snap structure, and the first gap is formed between the fifth connection plate and the auxiliary installation plate; the second snap portion includes a sixth connection plate formed by a portion of the second connection portion bent towards the first snap structure, and the second gap is formed between the sixth connection plate and the auxiliary installation plate; an end of the fifth connection plate is not in contact with the second connection portion, and an end of the sixth connection plate is not in contact with the first connection portion; and a projection of the fifth connection plate onto the auxiliary installation plate partially overlaps a projection of the sixth connection plate onto the auxiliary installation plate, to form the wire channel, and the interval is arranged between the fifth connection plate and the sixth connection plate.

Optionally, the fifth connection plate inclines to the auxiliary installation plate, and the sixth connection plate inclines to the auxiliary installation plate.

Optionally, the first snap portion includes a seventh connection plate formed by a portion of the first connection portion bent away from the auxiliary installation plate; the second snap portion includes an eighth connection plate formed by a portion of the second connection portion bent towards the seventh connection plate and a ninth connection plate formed by a portion of the eighth connection plate bent towards the auxiliary installation plate; an end of the seventh connection plate is not in contact with the second connection portion, and an end of the ninth connection plate is not in contact with the second connection portion; and a projection of the seventh connection plate onto the auxiliary installation plate at least partially overlaps a projection of the ninth connection plate onto the auxiliary installation plate, to form the wire channel, and the interval is arranged between the seventh connection plate and the ninth connection plate.

Optionally, the first connection portion is directly connected to the second connection portion.

The present disclosure further provides in at least one embodiment a display device including the above wire fixation apparatus.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

As shown in FIGS. 1-4, a wire fixation apparatus is provided in at least one embodiment of the present disclosure, including: a first snap structure 100, half surrounding a wire 10 and provided with a first opening at a side thereof; a second snap structure 200, half surrounding a wire 10 and provided with a second opening at a side thereof; and an auxiliary installation plate 310 connecting the first snap structure 100 to the second snap structure 200.

The first opening of the first snap structure 100 is opposite to the second opening of the second snap structure 200, the first snap structure 100, the second snap structure 200 and the auxiliary installation plate 310 together form a wire channel 400 for the wire 10 to pass therethrough, and an interval 500 is arranged between the first snap structure 100 and the second snap structure 200 to enable the wire 10 to be snapped into the wire channel 400 through the interval 500.

Projections of the first snap structure 100, the second snap structure 200 and the auxiliary installation plate 310 onto a first projection plane together encircle a projection of the wire channel 400 onto the first projection plane. The first projection plane is a plane of a cross section of the wire 10, and the first projection plane is perpendicular to an extension direction of the wire channel 400.

According to the wire fixation apparatus in at least one embodiment of the present disclosure, the opening of the first snap structure is opposite to the opening of the second snap structure, thereby forming a full-surrounding structure to fix the wire 10. Through the interval 500 between the first snap structure 100 and the second snap structure 200, the wire 10 may be snapped into the wire channel 400 formed by the first snap structure 100, the second snap structure 200 and the auxiliary installation plate 310 together. As such, the wire 10 may be fixed firmly by the full-surrounding structure, and the wire 10 is also easy to be removed. In addition, the wire 10 may not fall off from the snap during the transportation.

Optionally, in at least one embodiment of the present disclosure, the first snap structure 100 includes a first connection portion 101 fixed onto the auxiliary installation plate 310 and a first snap portion connected to the first connection portion 101, and the second snap structure 200 includes a second connection portion 201 fixed onto the auxiliary installation plate 310 and a second snap portion connected to the second connection portion 201.

According to the above solution, both the first snap structure 100 and the second snap structure 200 are snap structures, the first snap structure 100 and the second snap structure 200 are separately arranged on the auxiliary installation plate 310, or the first snap structure 100, the second snap structure 200 and the auxiliary installation plate 310 are connected to form an integral structure.

It can be appreciated that, the first snap structure 100 and the second snap structure 200 may be of other structures, not limited to the snap structure.

Figure 1:
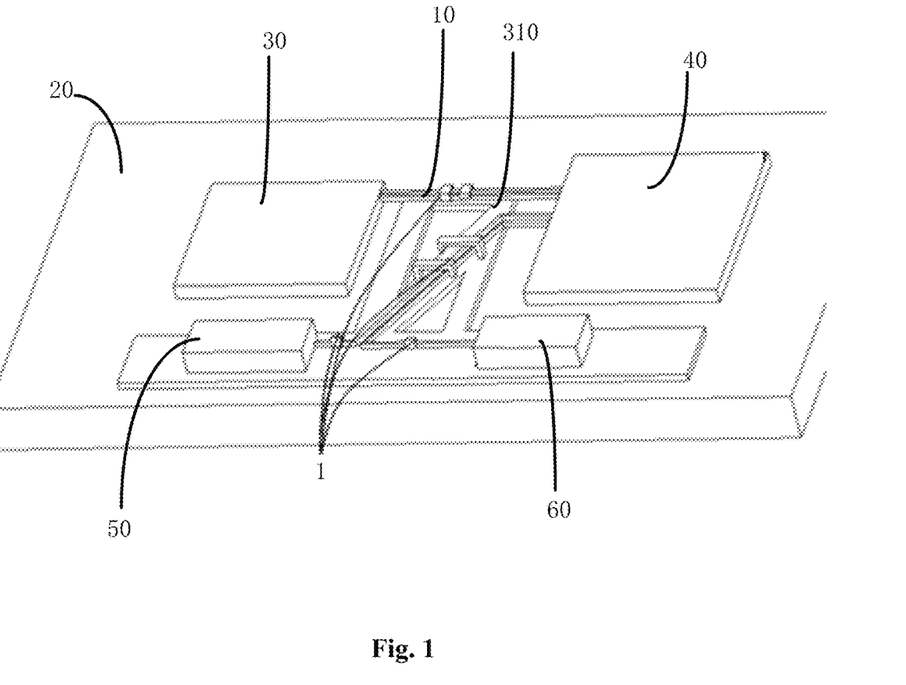
FIG. 1 is a schematic view of a display module back plate with a wire fixation apparatus in at least one embodiment of the present disclosure.
Figure 2A:
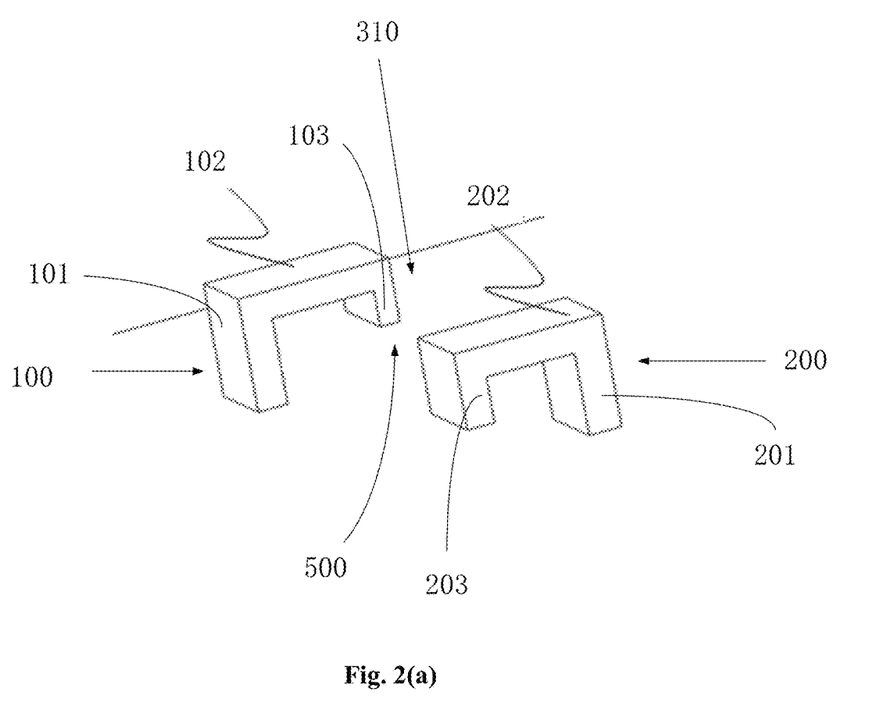
FIG. 2(a) is a schematic view of a wire fixation apparatus in at least one embodiment of the present disclosure.
Figure 2B:
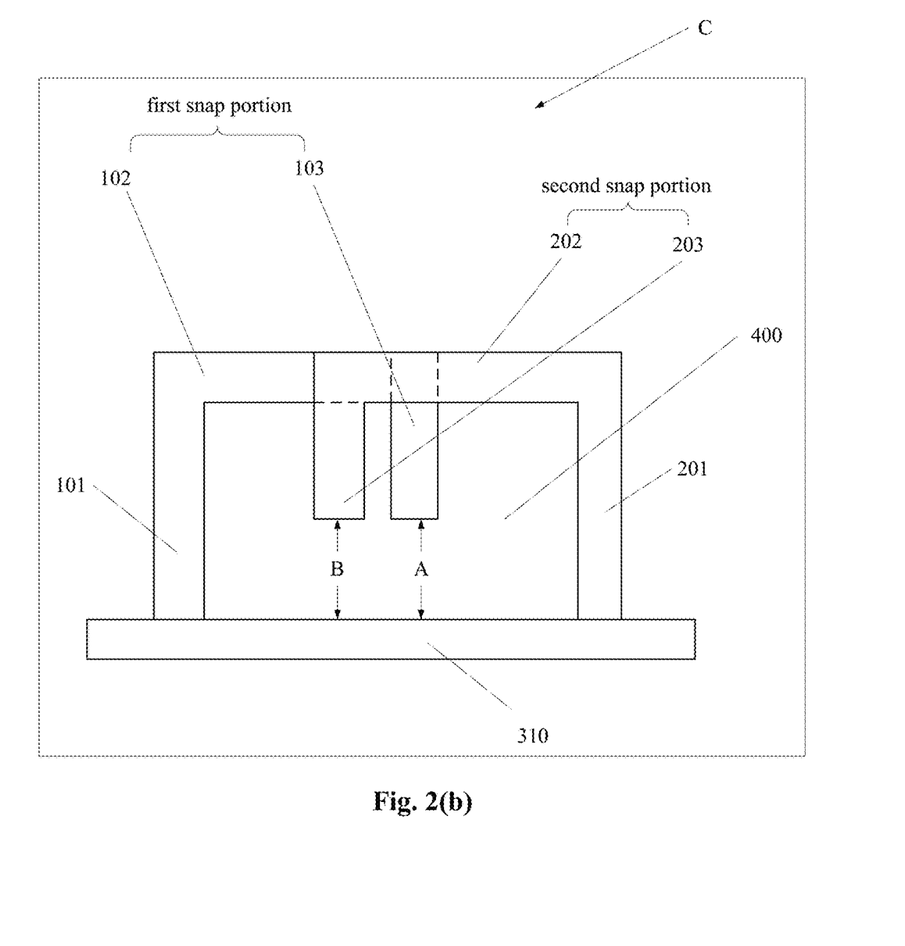
FIG. 2(b) is a side view of a wire fixation apparatus in at least one embodiment of the present disclosure.
Figure 2C:
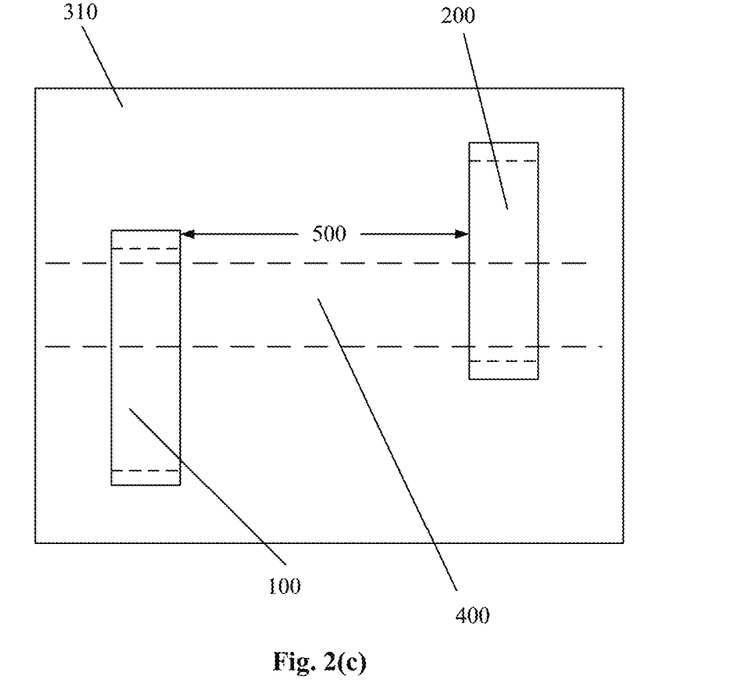
FIG. 2(c) is a top view of a wire fixation apparatus in at least one embodiment of the present disclosure.

FIG. 1 is a schematic view of a display module back plate with a wire fixation apparatus in at least one embodiment of the present disclosure, and FIGS. 2(a)-2(c) shows a wire fixation apparatus in at least one embodiment of the present disclosure.

In at least one embodiment of the present disclosure, as shown in FIGS. 2(a)-2(c), the first snap structure 100 includes the first connection portion 101 fixed onto the auxiliary installation plate 310 and the first snap portion connected to the first connection portion 101; and the second snap structure 200 includes the second connection portion 201 fixed onto the auxiliary installation plate 310 and the second snap portion connected to the second connection portion 201. As shown in FIGS. 2(b)-2(c), the first snap structure 100 is spaced apart from the second snap structure 200 in the extension direction of the wire 10 by a predetermined distance, to form the interval 500 between the first snap structure and second snap structure; and the projection of the first snap portion onto the first projection plane C partially overlaps the projection of the second snap portion onto the first projection plane C, so as to enable the projections of the first snap structure 100, the second snap structure 200 and the auxiliary installation plate 310 onto the first projection plane C together to encircle the projection of the wire 10 in the wire channel 400 onto the first projection plane C.

Optionally, the first snap portion includes a first connection plate 102 formed by a portion of the first connection portion 101 and a second connection plate 103 formed by a portion of the first connection plate 102 bent towards the auxiliary installation plate 310, where the first opening is formed in the second connection plate 103. The second snap portion includes a third connection plate 202 formed by a portion of the second connection portion 201 and a fourth connection plate 203 formed by a portion of the third connection plate 202 bent towards the auxiliary installation plate 310. The second opening is formed in the fourth connection plate 203, and a projection of the first connection plate 102 onto the first projection plane partially overlaps a projection of the third connection plate 202 onto the first projection plane, so as to enable the projections of the first snap structure 100, the second snap structure 200 and the auxiliary installation plate 310 onto the first projection plane C together to encircle the projection of the wire 10 in the wire channel 400 onto the first projection plane C.

To be specific, as shown in FIG. 2(b), the first snap structure 100 includes the first connection portion 101 and a first snap portion formed by a portion of the first connection portion 101 bent towards the auxiliary installation plate 310, the second snap structure 200 includes the second connection portion 201 and a second snap portion formed by a portion of the second connection portion 201 bent towards the auxiliary installation plate 310.

The first snap portion is spaced apart from the auxiliary installation plate 310, to form a first gap A between the first snap portion and the auxiliary installation plate 310.

The second snap portion is spaced apart from the auxiliary installation plate 310, to form a second gap B between the second snap portion and the auxiliary installation plate 310.

Optionally, as shown in FIGS. 2(a)-2(c), the first snap portion includes a first connection plate 102 formed by a portion of the first connection portion 101 bent towards the second snap structure 200 and a second connection plate 103 formed by a portion of the first connection plate 102 bent towards the auxiliary installation plate 310, where the first gap A is formed between the second connection plate 103 and the auxiliary installation plate 310.

The second snap portion includes a third connection plate 202 formed by a portion of the second connection portion 201 bent towards the first snap structure 100 and a fourth connection plate 203 formed by a portion of the third connection plate 202 bent towards the auxiliary installation plate 310, where the second gap B is formed between the fourth connection plate 203 and the auxiliary installation plate 310.

An end of the second connection plate 103 is not in contact with the first connection portion 101, and an end of the fourth connection plate 203 is not in contact with the second connection portion 201.

A projection of the first connection plate 102 onto the first projection plane partially overlaps a projection of the third connection plate 202 onto the first projection plane.

As shown in FIG. 1, the auxiliary installation plate 310 is arranged on the display module back plate 20, connection wires among wire boards of a power supply plate 30, a system board 40, an audio system 50 and other functional circuit module 60 (e.g., a remote signal collector, a WiFi board) may be fixed firmly through the wire fixation apparatus 1 in at least one embodiment of the present disclosure, and the connection wires may not fall off during the transportation of the product.

Figure 3A:
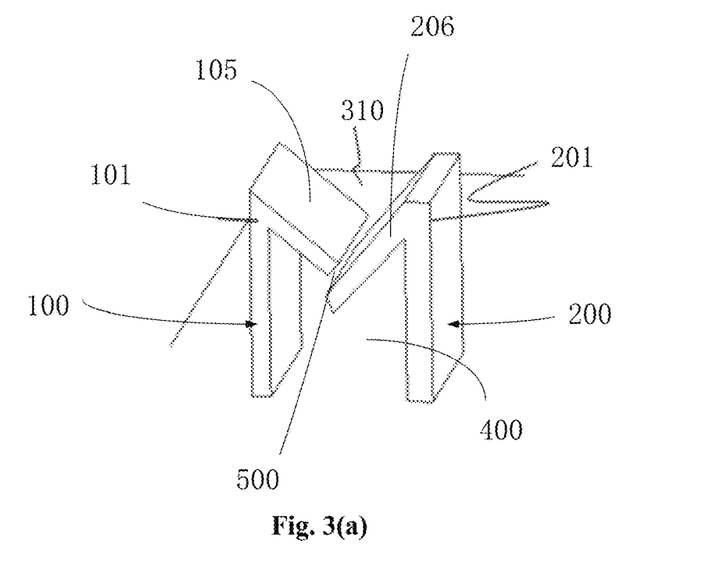
FIG. 3(a) is a schematic view of a wire fixation apparatus in at least one embodiment of the present disclosure.
Figure 3B:
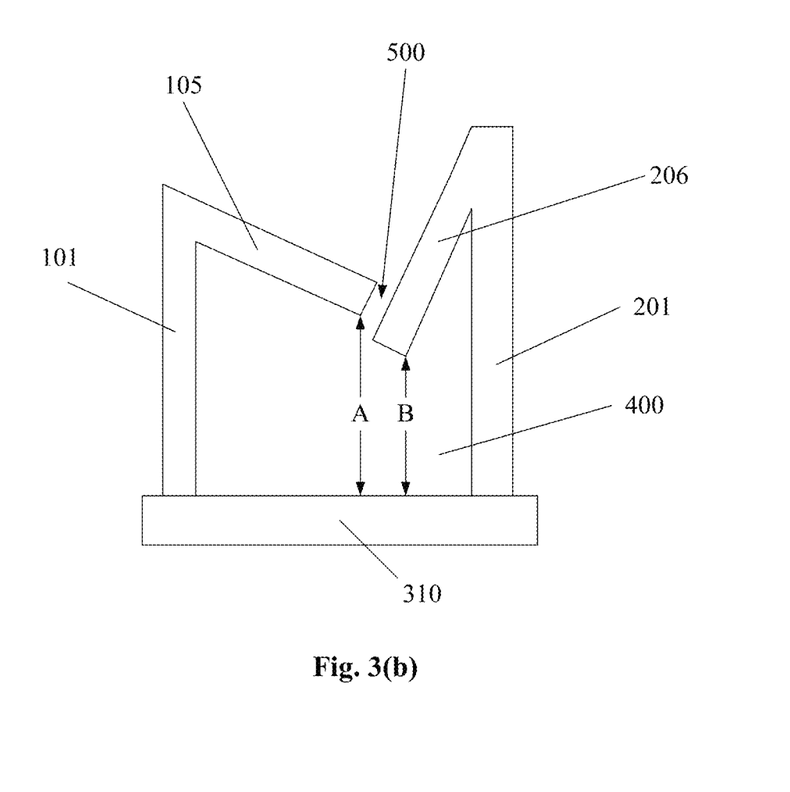
FIG. 3(b) is a schematic view of a wire fixation apparatus in at least one embodiment of the present disclosure.

FIGS. 3(a)-3(b) show a wire fixation apparatus in at least one embodiment of the present disclosure.

In at least one embodiment of the present disclosure, as shown in FIG. 3, the first snap structure 100 includes the first connection portion 101 fixed onto the auxiliary installation plate 310 and the first snap portion connected to the first connection portion 101; and the second snap structure 200 includes the second connection portion 201 fixed onto the auxiliary installation plate 310 and the second snap portion connected to the second connection portion 201.

The first snap portion includes a fifth connection plate 105 formed by a portion of the first connection portion 101, and the first opening is formed between the fifth connection plate 105 and the auxiliary installation plate 310. The second snap portion includes a sixth connection plate 206 formed by a portion of the second connection portion 201, and the second opening is formed between the sixth connection plate 206 and the auxiliary installation plate 310. The first connection portion 101 is arranged opposite to the second connection portion 201, at least a portion of the fifth connection plate 105 is arranged right above the sixth connection plate 206 and at a side of the sixth connection plate 206 away from the auxiliary installation plate 310, to enable the projections of the first snap structure 100, the second snap structure 200 and the auxiliary installation plate 310 onto the first projection plane together to encircle the projection of the wire 10 in the wire channel 400 onto the first projection plane; and a gap is formed between the fifth connection plate 105 and the six connection plate 206, to form the interval 500.

Optionally, the fifth connection plate 105 is formed by a portion of the first connection portion 101 bent towards the auxiliary installation plate 310, and the sixth connection plate 206 is formed by a portion of the second connection portion 201 bent towards the auxiliary installation plate 310.

To be specific, as shown in FIGS. 3(a)-3(b), the first snap structure 100 and the second snap structure 200 are oppositely arranged in a direction perpendicular to the wire channel.

The first snap portion includes the fifth connection plate 105 formed by a portion of the first connection portion 101 bent towards the second snap structure 200, and the first gap A is formed between the fifth connection plate 105 and the auxiliary installation plate 310.

The second snap portion includes the sixth connection plate 206 formed by a portion of the second connection portion 201 bent towards the first snap structure 100, and the second gap B is formed between the sixth connection plate 206 and the auxiliary installation plate 310.

An end of the fifth connection plate 105 is not in contact with the second connection portion 201, and an end of the sixth connection plate 206 is not in contact with the first connection portion 101.

A projection of the fifth connection plate 105 onto the auxiliary installation plate partially 310 overlaps a projection of the sixth connection plate 206 onto the auxiliary installation plate 310, to form the wire channel 400, and the interval 500 is arranged between the fifth connection plate 105 and the sixth connection plate 206.

Optionally, the fifth connection plate 105 inclines to the auxiliary installation plate 310, and the sixth connection plate 206 inclines to the auxiliary installation plate 310.

According to the above embodiments, both the fifth connection plate 105 and the sixth connection plate 206 are oblique plates. It should be appreciated that, in at least one embodiment of the present disclosure, the fifth connection plate 105 and the sixth connection plate 206 may be plane plates parallel to the auxiliary installation plate 310.

In the wire fixation apparatus in at least one embodiment of the present disclosure, both the first snap structure and the second snap structure are two-side snaps, which may fix the wire 10 and prevent the wire 10 from falling off. The first snap structure and the second snap structure may form an integral structure with the auxiliary installation plate 310.

Figure 4:
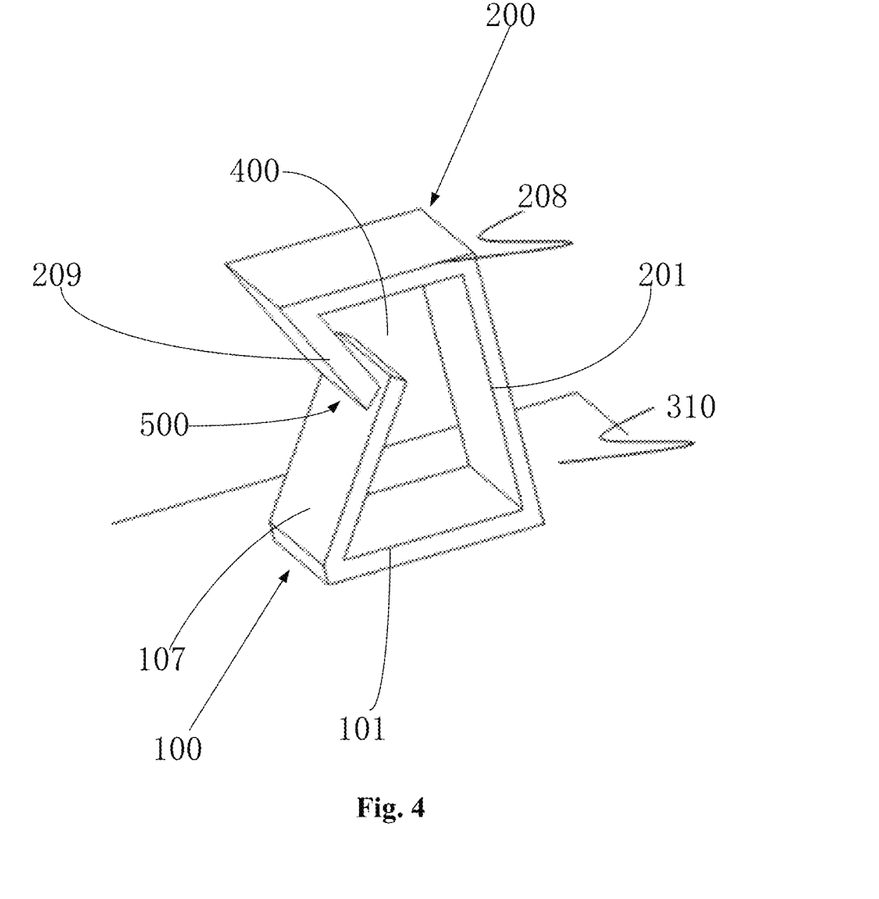
FIG. 4 is a schematic view of a wire fixation apparatus in at least one embodiment of the present disclosure.

FIG. 4 is a schematic view of a wire fixation apparatus in at least one embodiment of the present disclosure.

In at least one embodiment of the present disclosure, as shown in FIG. 4, the first snap structure 100 includes the first connection portion 101 fixed onto the auxiliary installation plate 310 and the first snap portion connected to the first connection portion 101; and the second snap structure 200 includes the second connection portion 201 fixed onto the auxiliary installation plate 310 and the second snap portion connected to the second connection portion 201.

Optionally, the first snap portion includes a seventh connection plate 107 formed by a portion of the first connection portion 101, and the first opening is arranged between the seventh connection plate 107 and the first connection portion 101; the second snap portion includes an eighth connection plate 208 formed by a portion of the second connection portion 201 and a ninth connection plate 209 formed by a portion of the eighth connection plate 208 bent towards the auxiliary installation plate 310, and the second opening is arranged between the ninth connection plate 209 and the second connection portion 201.

At least a portion of the ninth connection plate 209 is arranged right above the seventh connection plate 107 and at a side of the seventh connection plate 107 away from the auxiliary installation plate 310, to enable the projections of the first snap structure 100, the second snap structure 200 and the auxiliary installation plate 310 onto the first projection plane together to encircle the projection of the wire 10 in the wire channel 400 onto the first projection plane; and a gap is formed between the ninth connection plate 209 and the seventh connection plate 107, to form the interval 500.

To be specific, as shown in FIG. 4, the first snap portion includes the seventh connection plate 107 formed by a portion of the first connection portion 101 bent away from the auxiliary installation plate.

The second snap portion includes the eighth connection plate 208 formed by a portion of the second connection portion 201 bent towards the seventh connection plate 107 and the ninth connection plate 209 formed by a portion of the eighth connection plate 208 bent towards the auxiliary installation plate 310.

An end of the seventh connection plate 107 is not in contact with the second connection portion 201, and an end of the ninth connection plate 209 is not in contact with the second connection portion 201.

A projection of the seventh connection plate 107 onto the auxiliary installation plate 310 at least partially overlaps a projection of the ninth connection plate 209 onto the auxiliary installation plate 310, to form the wire channel 400, and the interval 500 is arranged between the seventh connection plate 107 and the ninth connection plate 209.

Optionally, the first connection portion 101 is directly connected to the second connection portion 201.

The wire fixation apparatus in at least one embodiment of the present disclosure is a full-surrounding snap structure, the first connection portion 101 is connected to the second connection portion 201 to form an integral structure. The first connection portion 101 and the second connection portion 201 may be plastic injection parts. The wire 10 may be snapped into the first snap structure 100 and the second snap structure 200 via the interval 500.

The present disclosure further provides in at least one embodiment a display device including the above wire fixation apparatus.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A wire fixation apparatus, comprising:
   a first snap structure, provided with a first opening at a side thereof;
   a second snap structure, provided with a second opening at a side thereof; and
   an auxiliary installation plate connecting the first snap structure to the second snap structure;
   wherein the first opening of the first snap structure is opposite to the second opening of the second snap structure, the first snap structure, the second snap structure and the auxiliary installation plate together form a wire channel for the wire to pass therethrough, and an interval is arranged between the first snap structure and the second snap structure to enable the wire to be snapped into the wire channel through the interval;
   wherein projections of the first snap structure, the second snap structure and the auxiliary installation plate onto a first projection plane together encircle a projection of the wire channel onto the first projection plane, and the first projection plane is perpendicular to an extension direction of the wire channel;
   wherein the first snap structure is spaced apart from the second snap structure in the extension direction of the wire channel by a predetermined distance, to form the interval between the first snap structure and second snap structure, and the predetermined distance is larger than a width of the first snap structure and a width of the second snap structure in the extension direction of the wire channel.

2. The wire fixation apparatus according to claim 1, wherein
   the first snap structure comprises a first connection portion fixed onto the auxiliary installation plate and a first snap portion connected to the first connection portion; and
   the second snap structure comprises a second connection portion fixed onto the auxiliary installation plate and a second snap portion connected to the second connection portion.

3. The wire fixation apparatus according to claim 2, wherein
   the projection of the first snap portion onto the first projection plane partially overlaps the projection of the second snap portion onto the first projection plane, to enable the projections of the first snap structure, the second snap structure and the auxiliary installation plate onto the first projection plane together to encircle the projection of the wire channel onto the first projection plane.

4. The wire fixation apparatus according to claim 3, wherein
   the first snap portion comprises a first connection plate formed by a portion of the first connection portion and a second connection plate formed by a portion of the first connection plate bent towards the auxiliary installation plate, wherein the first opening is formed in the second connection plate;
   the second snap portion comprises a third connection plate formed by a portion of the second connection portion and a fourth connection plate formed by a portion of the third connection plate bent towards the auxiliary installation plate, wherein the second opening is formed in the fourth connection plate; and
   a projection of the first connection plate onto the first projection plane partially overlaps a projection of the third connection plate onto the first projection plane.

5. The wire fixation apparatus according to claim 2, wherein
   the first snap structure and the second snap structure are separately arranged on the auxiliary installation plate; or the first snap structure and the second snap structure are connected to the auxiliary installation plate to form an integral structure.

6. The wire fixation apparatus according to claim 1, wherein
   the first snap structure comprises a first connection portion and a first snap portion formed by a portion of the first connection portion bent towards the auxiliary installation plate,
   the second snap structure comprises a second connection portion and a second snap portion formed by a portion of the second connection portion bent towards the auxiliary installation plate; wherein
   the first snap portion is spaced apart from the auxiliary installation plate, to form a first gap between the first snap portion and the auxiliary installation plate,
   the second snap portion is spaced apart from the auxiliary installation plate, to form a second gap between the second snap portion and the auxiliary installation plate; and
   projections of the first snap portion and the second snap portion onto at least one of the first projection plane and the auxiliary installation plate at least partially overlap each other.

7. The wire fixation apparatus according to claim 6, wherein
   the first snap structure is spaced apart from the second snap structure by a predetermined distance in an extension direction of the wire channel, to form the interval; and
   projections of the first snap portion and the second snap portion onto the first projection plane at least partially overlap each other, to form the wire channel.

8. The wire fixation apparatus according to claim 7, wherein
   the first snap portion comprises a first connection plate formed by a portion of the first connection portion bent towards the second snap structure and a second connection plate formed by a portion of the first connection plate bent towards the auxiliary installation plate, wherein the first gap is formed between the second connection plate and the auxiliary installation plate;
   the second snap portion comprises a third connection plate formed by a portion of the second connection portion bent towards the first snap structure and a fourth connection plate formed by a portion of the third connection plate bent towards the auxiliary installation plate, wherein the second gap is formed between the fourth connection plate and the auxiliary installation plate;

an end of the second connection plate is not in contact with the first connection portion, and an end of the fourth connection plate is not in contact with the second connection portion; and a projection of the first connection plate onto the first projection plane partially overlaps a projection of the third connection plate onto the first projection plane.

9. A display device comprising the wire fixation apparatus according to claim 1.

10. A wire fixation apparatus, comprising:
a first snap structure, provided with a first opening at a side thereof;
a second snap structure, provided with a second opening at a side thereof; and
an auxiliary installation plate connecting the first snap structure to the second snap structure;
wherein the first opening of the first snap structure is opposite to the second opening of the second snap structure, the first snap structure, the second snap structure and the auxiliary installation plate together form a wire channel for the wire to pass therethrough, and an interval is arranged between the first snap structure and the second snap structure to enable the wire to be snapped into the wire channel through the interval;
wherein projections of the first snap structure, the second snap structure and the auxiliary installation plate onto a first projection plane together encircle a projection of the wire channel onto the first projection plane, and the first projection plane is perpendicular to an extension direction of the wire channel;
wherein the first snap structure comprises a first connection portion fixed onto the auxiliary installation plate and a first snap portion connected to the first connection portion; and
the second snap structure comprises a second connection portion fixed onto the auxiliary installation plate and a second snap portion connected to the second connection portion;
wherein
the first snap portion comprises a seventh connection plate formed by a portion of the first connection portion, and the first opening is arranged between the seventh connection plate and the first connection portion;
the second snap portion comprises an eighth connection plate formed by a portion of the second connection portion and a ninth connection plate formed by a portion of the eighth connection plate bent towards the auxiliary installation plate, and the second opening is arranged between the ninth connection plate and the second connection portion;
wherein at least a portion of the ninth connection plate is arranged right above the seventh connection plate and at a side of the seventh connection plate away from the auxiliary installation plate; and
a gap is formed between the ninth connection plate and the seventh connection plate, to form the interval;
the first snap structure is connected to the second snap structure to form an integral structure.

11. A wire fixation apparatus, comprising:
a first snap structure, provided with a first opening at a side thereof;
a second snap structure, provided with a second opening at a side thereof; and
an auxiliary installation plate connecting the first snap structure to the second snap structure;
wherein the first opening of the first snap structure is opposite to the second opening of the second snap structure, the first snap structure, the second snap structure and the auxiliary installation plate together form a wire channel for the wire to pass therethrough, and an interval is arranged between the first snap structure and the second snap structure to enable the wire to be snapped into the wire channel through the interval;
wherein projections of the first snap structure, the second snap structure and the auxiliary installation plate onto a first projection plane together encircle a projection of the wire channel onto the first projection plane, and the first projection plane is perpendicular to an extension direction of the wire channel;
the first snap structure comprises a first connection portion and a first snap portion formed by a portion of the first connection portion bent towards the auxiliary installation plate,
the second snap structure comprises a second connection portion and a second snap portion formed by a portion of the second connection portion bent towards the auxiliary installation plate; wherein
the first snap portion is spaced apart from the auxiliary installation plate, to form a first gap between the first snap portion and the auxiliary installation plate,
the second snap portion is spaced apart from the auxiliary installation plate, to form a second gap between the second snap portion and the auxiliary installation plate; and
projections of the first snap portion and the second snap portion onto at least one of the first projection plane and the auxiliary installation plate at least partially overlap each other;
the first snap portion comprises a seventh connection plate formed by a portion of the first connection portion bent away from the auxiliary installation plate;
the second snap portion comprises an eighth connection plate formed by a portion of the second connection portion bent towards the seventh connection plate and a ninth connection plate formed by a portion of the eighth connection plate bent towards the auxiliary installation plate;
an end of the seventh connection plate is not in contact with the second connection portion, and an end of the ninth connection plate is not in contact with the second connection portion; and
a projection of the seventh connection plate onto the auxiliary installation plate at least partially overlaps a projection of the ninth connection plate onto the auxiliary installation plate, to form the wire channel, and the interval is arranged between the seventh connection plate and the ninth connection plate;
wherein the first connection portion is directly connected to the second connection portion.

* * * * *